US005560950A

United States Patent [19]

Conte et al.

[11] Patent Number: 5,560,950

[45] Date of Patent: Oct. 1, 1996

[54] FREE FATTY ACID REMOVAL FROM USED FRYING FAT

[75] Inventors: Joseph A. Conte, Waterford; Kenneth R. Stauffer, East Brunswick, both of N.J.

[73] Assignee: Campbell Soup Company, Camden, N.J.

[21] Appl. No.: 455,682

[22] Filed: May 31, 1995

[51] Int. Cl.$^{6}$ ........ A23D 7/00

[52] U.S. Cl. ........ 426/330.6; 426/422; 426/438

[58] Field of Search ........ 426/601, 330.6, 426/423, 417, 438, 422

[56] References Cited

U.S. PATENT DOCUMENTS

| | | | |
|---|---|---|---|
| 3,491,132 | 1/1970 | Reiners et al. . | |
| 3,947,602 | 3/1976 | Clewell | 426/417 |
| 4,112,129 | 9/1978 | Duensing | 426/423 |
| 4,235,795 | 11/1980 | Cohen | 426/417 |
| 4,330,564 | 5/1982 | Friedman | 426/423 |
| 4,652,458 | 3/1987 | Frost | 426/423 |
| 4,701,438 | 10/1987 | Taylor | 426/423 |
| 4,735,815 | 4/1988 | Taylor et al. | 427/417 |
| 4,764,384 | 8/1988 | Gyann | 426/423 |
| 4,880,573 | 11/1989 | Courregelongue et al. | 260/420 |
| 4,880,574 | 11/1989 | Welsh | 426/417 |
| 4,968,518 | 11/1990 | Lopez | 426/330.6 |
| 5,063,077 | 11/1991 | Vollbrecht et al. | 426/614 |
| 5,232,725 | 8/1993 | Roderbourg et al. | 426/417 |
| 5,348,755 | 9/1994 | Roy | 426/423 |
| 5,391,385 | 2/1995 | Seybold | 426/417 |

OTHER PUBLICATIONS

D. French et al. *Studies on the Schardinger Dextrins. The Preparation and Solubility Characteristics of Alpha, Beta and Gamma Dextrins*, J. Am. Chem. Soc., 71, 353 (1949)

D. French, *Methods in Enzymology* , S. P. Colowick and N. O. Kaplan, editors, Academic Press, N.Y., vol. V (1962), pp. 148–155.

*Primary Examiner*—Carolyn Paden

*Attorney, Agent, or Firm*—Banner & Allegretti, Ltd.

[57] ABSTRACT

A method for reducing the free fatty acid content of frying facts and oils that comprises heating the flying fat or oil to a temperature of less than about 120° C. and stirring into the heated fat or oil less than about 10% by weight of cyclodextrin and less than about 10% by weight of a powdered absorbent to form a slurry. Allowing the slurry mixture to react for less than about one and one half hours and then separating the cyclodextrin, absorbent material and free atty acid from the frying fat or oil, thereby reducing the free fatty acid content of the remaining frying fat or oil.

20 Claims, No Drawings

FREE FATTY ACID REMOVAL FROM USED FRYING FAT

BACKGROUND OF THE INVENTION

1. Field of the Invention

The invention relates to the removal of free fatty acid from used frying fat and oils, for example in commercial fast food restaurants where large amounts of frying fat and oils are used in food preparation. In particular, the invention relates to the use of a dry cyclodextrin/absorbent mixture that is reacted with the used frying fat or oil under low heat, followed by a slight reduction in temperature and the addition of a small amount of water to aid agglomeration. This is followed by filtration to separate the agglomerated cyclodextrin/absorbent and free fatty acid from the frying fat or oil.

2. Prior Art

It has long been known that frying fat and cooking oils tend to decompose to some extent with use thereby forming fatty acids in the fat and/or oil. The presence of free fatty acids in used frying fat and edible oils leads to undesirable properties and degradation of their frying properties. Such undesirable properties include but are not necessarily limited to excessive smoke formulation at higher cooking temperatures and a tendency of the frying fats and cooking oils with even small amounts of free fatty acid to foam or boil while cooking. These undesirable properties make used frying fats and oils more difficult to work with due to the presence of the excessive smoke and the increased risk of burns resulting from the spattering of the foaming or boiling frying fat or oil.

Further, the presence of free fatty acids in used frying fats and oils degrades their frying properties causing the foods fried in such fats and oils to often become too browned on the outside before the food is properly cooked on the inside. The presence of free fatty acids also causes used frying fats and oils to have oleophilic properties with food which often leaves oily residues on the surface of fried foods prepared in used frying fats and oils.

Skilled practitioners in this art have tried numerous different approaches to find an inexpensive method to purify used frying fats and oils and remove the free fatty acids which are largely responsible for the undesirable and degraded frying properties associated with the use of used frying fats and oils. For example, edible glyceride oils have been conventionally refined by alkali treatment such as with an aqueous solution of sodium hydroxide. The alkali treatment neutralizes the free fatty acids by forming soaps. In U.S. Pat. No. 3,008,972 oils having a high free fatty acid content are treated with a sodium hydroxide and concentrated diammonium phosphate solution. In Japanese Patent 5532 (1954) refined oils of high free fatty acid content were suspended in strong ethanol solutions before being treated with alkali to purify the oils.

A problem with the use of alkali treatments to remove free fatty acids, however, is that the free fatty acids are neutralized by forming soaps, which are in themselves an undesirable byproduct. Further, when free fatty acids are removed by alkali treatments some neutral oil is often lost by entrainment or occlusion in the soap that is formed.

Another prior art approach to the problem of purifying used frying fats and oils has been to use treating agents such as clays, magnesium silicates, zeolites, activated aluminas and charcoal. U.S. Pat. No. 4,735,815 and U.S. Pat. No. 4,701,438, for example, disclose the purification of used frying oils; and fats by contacting the oils and fats with a treating composition of an acid activated clay or a magnesium silicate and gel-derived alumina. For example, the acid activated clay may be a bentonite activated with sulfuric acid. The magnesium silicate may either be natural, such as talc or serpentine, or synthesized such as by the interaction of a magnesium salt and a soluble silicate. The gel-derived alumina suitable for use in the treating composition has a pseudoboehmite content of at least 20% by weight. The disadvantage of using such a treatment composition, however, is that purification of the fats and oils takes place at controlled elevated temperatures within the temperature range from about: 120° C. to about 190° C. Lower temperatures affect the efficiency of the treatment, while higher temperatures may cause the oils or fats to further degrade, thus causing losses.

Another approach to reducing the free fatty acid content of edible oils disclosed in U.S. Pat. No. 3,491,132 is to purify, the oils by using a clyclodextrin to form a clathrate with free fatty acids and then remove the clathrated cyclodextrin and fatty acids. This approach, however, is disclosed as a means of initial purification for oils with exceptionally high free fatty acid content, i.e., essentially those with more than about 5% and as high as 10 to 20% free acid content. Due to their very high free fatty acid content, these crude oils are often considered unrefinable due to the large neutral oil losses that are incurred during conventional refining of such oils. However as disclosed in U.S. Pat. No. 3,491,132, cyclodextrin may be used in an initial refining process to reduce the undesirably high free fatty acid content of, e.g. about 10 to 20%, to lower workable levels of, e.g., below about 5%. Once the free fatty acid content of such oils is reduced to below about 5%, further free fatty acid removal may thereafter be efficiently accomplished by conventional means, such as by alkali treatment.

In addition to the disadvantage of requiring a subsequent further conventional refining step or process such as alkali treatment with its associated disadvantages, the method disclosed in U.S. Pat. No. 3,491,132 also suffers from the disadvantages that the disclosed process requires a significant quantity of water for clathration and very large amounts of cyclodextrin in relation to the amount of oil to be purified. In general, for this method about equal amounts of the oil and cyclodextrin are mixed with water in an amount equal to about one-half of the amount of the oil to be purified.

U.S. Pat. No. 4,330,564 discloses a process for treating used fryer cooking oil at an elevated temperature of from about 300° F. to about 400©F. (about 149° C. to about 204° C.) with a composition of water, food compatible acid such as citric, tartaric or phosphoric acid, and a porous carrier such as porous rhyolite or perlite. The carrier must have sufficient porosity to absorb the water and release it when the composition is contacted with the hot oil. The high temperature of the oil during treatment causes steaming and releasing of the water from the porous carrier and food compatible acid in the composition. This steaming is relied upon to cause jet-propelled dispersal of the composition throughout the oil to allow good contact between the treating composition and the oil. Once the treatment is competed, the residue of the composition is removed by hot filtering the oil. As with other prior art methods discussed, this method of removal of fatty acids also has the disadvantages that it must be carried out at elevated temperatures and requires a significant quantity of water to effect dispersion of the food compatible acid and absorbent in the oil.

Another prior art approach to purifying used frying fat and oil relates to processes that use filtering media. U.S. Pat.

No. 4,764,384 is exemplary of such processes. It discloses the use of a filtering media containing synthetic amorphous silica with absorbed moisture, synthetic amorphous magnesium silicate, diatomaceous earth and synthetic amorphous silica-alumina. This filtering media is mixed with the used frying fat or cooking oil at an elevated temperature of about 275° F. (135° C.) to form a slurry. According to this process, the most effective absorption action is produced when the cooking oil and filtering media are hot, such as at about 275° F. After about five (5) minutes of contact, the hot slurry is passed through a paper filter thereby trapping the filtering media and other contaminants and allowing the purified oil to pass through the paper filter to a container. As with other prior art approaches, this method also suffers from disadvantages associated with purifying used frying fats and oils at elevated temperatures.

In view of the disadvantageous of the prior art approaches, it would be very desirable to provide a method of removing free fatty acid from used frying fats and oils that overcomes these disadvantages. In particular, it would be desirable to provide a method of removing free fatty acid from used frying fats and oils that does not have to be carried out at excessive elevated temperatures and that does not require significant quantities of water and/or other compositions in relation to the amount of used frying tat or oil from which the free fatty acid is to be removed.

Thus there exists a need to formulate a method of removing free fatty acids from used frying fats and oils that can be carried out at relatively low temperatures compared to prior art processes, and therefore more safely with reduced risk of burns. There also exists a need to formulate a method of removing free fatty acids from frying fats and oils that can be carried out without the use of significant quantities of water and/or other compositions in relation to the amount of used frying fat or oil to be purified.

SUMMARY OF THE INVENTION

The invention is directed to removal of free fatty acid from used frying fats and/or oils. Typically, the free fatty acid content of such used frying fats and oils is generally less than about 5% by weight. A quantity of cyclodextrin, preferably β-cyclodextrin may be mixed, preferably in dry form, with an absorbent, preferably a fine grade silica such as Hy-flo® super cel, a very fine grade of diatomaceous earth made by the Manville company. The used frying fat or oil to be purified is heated, preferably to a temperature of about 80° C., as the dry cyclodextrin/absorbent mixture is stirred into the fat or oil. Upon reaching a temperature of preferably about 80° C., the temperature of the composition is maintained relatively constant while the stirring continues and the cyclodextrin/absorbent is allowed to react with the used frying fat or oil for a period of time of preferably about half an hour, thereby allowing entrainment of free fatty acids present in the used frying fat or oil. While continuing to stir the composition, the temperature of the frying fat or oil and cyclodextrin/absorbent composition is next reduced, preferably to a temperature of about 60° C. to allow agglomeration of the cyclodextrin/absorbent. A very small amount of water, preferably not more than about 5% by weight of the composition and most preferably within the range of about 1 to 2% by weight, may be added to the composition to aid agglomeration with the cyclodextrin/absorbent. The frying fat or oil and the agglomerated cyclodextrin/absorbent composition is then filtered through a precoated filter paper in a vacuum filter to separate the agglomerated cyclodextrin/absorbent with the entrained free fatty acids from the frying fat or oil. Upon completion of the process of this invention, it has been found that a very large amount of the free fatty acid that had been present in the used frying fat or oil before the process is now removed from the frying fat or oil that is recovered after filtering.

The process of the invention provides a restored frying fat or oil with greatly reduced free fatty acids and therefore very desirable properties, i.e., less smoke formulation at higher cooking temperatures and less tendency to foam or boil while cooking thereby lessening the hazard of burns due to spattering caused by foaming or boiling frying fat or oil. Other desirable properties of the restored used frying fat or oil include improved frying properties such as allowing food to properly brown on the outside while also allowing proper cooking of the inside of the food. Further, frying fats and oils that have been processed and restored according to this invention also provide oleophobic properties with food, reducing and eliminating the oily residue of the type found on foods fried with the used fat or oil prior to the removal of free fatty acids from the oil in accordance with the process of the invention.

Accordingly, it is an object of the present invention to provide a process for the removal of free fatty acids from used frying fats and oils which is neither cumbersome, complicated nor costly to implement.

It is another object of the present invention to provide a process for the removal of free fatty acids from used frying fats and oils that avoids hazards associated with prior art methods of purifying such fats and oils at high temperatures and/or using significant quantities of water, and thereby decreases the likelihood of burns due to the spattering of high temperature fats and oils during such processes. These and other various features, advantages and objects of the present invention will be apparent from the following detailed description of the invention.

DETAILED DESCRIPTION OF THE PREFERRED EMBODIMENTS

This invention relates to the removal of free fatty acid from used frying fats and oils by reacting a mixture of cyclodextrin and an absorbent such as silica under slight heat for a period of time sufficient to permit entrainment of free fatty acids. The temperature is then reduced and a very slight amount of water may be added to aid agglomeration of the cyclodextrin and absorbent. The thus-treated frying fat or oil is then filtered to separate the frying fat or oil from the agglomerated cyclodextrin/absorbent and free fatty acids.

For the purposes of this invention the term "frying fats and oils" refers to any of those animal or vegetable derived oils or fats which are customarily used in frying foods. These oils and fats are generally mixtures of mixed glycerides and include both saturated and unsaturated compounds and mixtures thereof. Typical oils and fats employed in the food industry include animal fats, lard and tallow; fish oils; olive, peanut, corn, soybean, sunflower and safflower oils. The major constituents in these oils and fats are esterified oleic and linoleic acids. Mixtures of oils and fats are also included with the meaning of the above term.

Cyclodextrins are a group of homologous oligosaccharides that are obtained from starch by the action of enzymes elaborated by *Bacillus macerans*. They are homologous cyclic molecules containing six (6) or more α-D-glucopyranose units linked together at the 1,4 positions as in amylose. The cyclic molecule may also be referred to as a torus. As a consequence of the cyclic arrangement, this torus is characterized by having neither a reducing end group nor a non-reducing end group.

α-Cyclodextrin or cyclohexaamylose contains six anhydrogluose units, while β-cyclodextrin or cycloheptaamylose contains seven anhydroglucose units. γ-Cyclodextrin or cyclooctaamylose contains eight anhydroglucose units. Reference herein to "cyclodextrin" is intended to encompass each of these forms as well as other forms which may have a still larger number of anhydroglucose units in the molecule, and mixtures of these and other homologs.

The various homologous cyclodextrins, having from six to eight units, or higher, and their mixtures, may be used as equivalent materials for the purposes of this invention. In practice, there may be little reason for separating the various fractions, and the cyclodextrin employed may contain a preponderance of one homolog or another. Similarly, derivatives of the homologs and modified cyclodextrins such as hydroxyalkyl-cyclodextrins, the maltosylcyclodextrins, the glucosyl-cyclodextrins and the alkyl-cyclodextrins may also be used in accordance with the present invention. Preferably however β-cyclodextrin is used. Except as otherwise specifically indicated, however, no distinction between the various homologous cyclodextrins or their mixtures or derivatives is intended when using the term "cyclodextrin."

Cyclodextrin is produced from starch by the action of an enzyme commonly known as cyclodextrin transflucosylase (*B. macerans amylase*). This enzyme may be produced by following published teachings such as for example, those described by D. French in Methods in Enzymology, S. P. Colowick and N. O. Kaplan, editors, Academic Press, New York, N.Y., vol. V, 1962, pp. 148–155, which is incorporated herein by reference. In general, the cyclodextrin transglucosylase is added to a dilute solution of a gelatinized starch, whereupon a conversion to cyclodextrin occurs by enzymolysis. Procedures for making and isolating the cyclodextrins are well known and if desired, the various homologs such as for example, the α, β and γ homologs, may be obtained by procedures described by D. French, et al., J. Am. Chem. Soc., 71, 353 (1949), which is incorporated herein by reference.

Cyclodextrins have a hydrophobic cavity which allows the formation of inclusion complexes by insertion of organic molecules. Thus the torus molecule acts in effect as a host molecule for these organic molecules to form inclusion complexes. It is this feature which is believed to make cyclodextrins especially useful in the present invention for removing free fatty acids from used frying fats and oils.

Cyclodextrin is most effective in the invention when used in combination with an absorbent, preferably a nonpolar material, for example silica. Especially preferred for the present invention is the use of silica in the form of a very fine powder, having very small and very uniform particles, such as Hy-flo® super cel, which is a very fine grade of diatomaceous earth. Other suitable absorbents which may be used in the invention may for example include, but are not limited to, fuller's earth, diatomaceous earth, cellulose and other similar well known absorbents characterized by their small and uniform particle size. Especially preferred are fine grade absorbents with particles of about 300 microns or there about which may be used to advantage as filtering media. Examples of some commercially available absorbents include products such as Celite® 545 and Celite® 503 which are available from suppliers such as J. T. Baker, Inc. of Phillipsburg, N.J.

In a preferred embodiment of the process of this invention, used frying fat from a commercial restaurant fish frying operation having free fatty acids (F.F.A.) of about 1.69% (determined using the AOCS Ca5-40 method). F.F.A. is purified by substantially reducing the free fatty acid content of the used frying fat. The used frying fact is subjected to moderate heat sufficient to bring the used fat to a temperature of preferably about 80° C. within a few minutes and to maintain the used fat at about that temperature for preferably about half an hour. While the used frying fat is being heated to a temperature of about 80° C., an amount of βcyclodextrin in dry powder form preferably equal to about 5% by weight of the frying fat to be purified is stirred into the frying fat, thoroughly mixing the β-cyclodextrin and used frying fat with a small laboratory blender operating at about 60 r.p.m. An absorbent, preferably a silica of very small and uniform particle size, such as Hy-Flo® super cel, in an amount preferably about equal to the amount of β-cyclodextrin or about 5% by weight of the frying fat is then added to the heated frying fat and β-cyclodextrin mixture while continuing to stir with the laboratory blender, thereby forming the mixture into a slurry at a temperature of about 80° C. The slurry is then held at a temperature of preferably about 80° C. for a period of preferably about one half hour. During this time, the slurry is continuously stirred using the laboratory blender. The exact speed at which stirring is accomplished is dependent upon the type of equipment used, but should be sufficiently slow to avoid forming a vortex that would entrain air within the slurry. During this time the β-cyclodextrin and silica absorbent are allowed to interact with the used frying fat and entrain free fatty acids contained therein. It is believed that during this time, molecules of the free fatty acids form inclusion complexes with the β-cyclodextrin After the slurry of heated frying fat, β-cyclodextrin and Hy-flo® super cel has been stirred at a temperature of preferably about 80° C. for a period of time preferably about one half hour, the slurry is allowed to slightly cool while still being stirred, preferably to a temperature of about 60° C. This slight cooling permits agglomeration of the β-cyclodextrin/silica absorbent with the entrained free fatty acids. At the lower temperature, a very small amount of water, preferably not more than about 5% by weight of the frying fat and most preferably no more than about 1 to 2% by weight, may be added to the slurry to aid the agglomeration of the β-cyclodextrin/silca absorbent and free fatty acids.

Once the β-cyclodextrin/silica absorbent and free fatty acids have agglomerated, they are separated from the frying fat by filtration through a polymer precoated filter paper using a slight vacuum. Such precoated paper filters are well known in the art and are often used for filtering frying fats and oils from deep fryers in many restaurants. For example, it is customary in many fast food restaurants to filter the cooking oil at the end of the day. Larger fryers, such as the gas fired fifty pound fryers in conventional use, are provided with drains, and the spent cooking oil is drained from the fryer through such paper filters to remove particulate matter.

The heated frying fat at a temperature of preferably about 60° C. easily passes through the precoated filter paper into a container and may be recovered. The agglomerated β-cyclodextrin/silica absorbent and entrained fatty acids, however, are trapped by the precoated filter paper and easily separated. Analysis of the frying fat in the container recovered according to the process of this invention following filtration should show a reduction in free fatty acids on the order of about as much as up to about a third of that originally present.

The following Examples further illustrate the effectiveness of the novel process of this invention in reducing the amount of free fatty acid content in used frying fats and oil.

These Examples illustrate the various embodiments of practicing the method of this invention, but such examples should not be viewed as representing the exclusive embodiments of the invention. While the examples do include the best mode contemplated for practicing the invention, they are intended only to illustrate various teachings to the art.

EXAMPLE I

About 300 grams of frying fat that had been used for frying fish in a commercial restaurant and having a free fatty acid (F.F.A.) content of 1.69% was heated to a steady temperature of 80° C. During this heating to bring the used frying fat to a steady temperature of 80° C., 15 grams of β-cyclodextrin in the form of a dry powder was stirred into the fat using a small laboratory blender operating at a speed of about 60 r.p.m. As soon as the β-cyclodextrin was stirred into the frying fat, 15 grams of very fine silica powder (Hy-Flo® super cel) was added to the frying fat and β-cyclodextrin mixture while stirring with the same blender continued in order to form the composition into a slurry at 80° C. The slurry was held at this temperature for 30 minutes while stirring with the blender was continued. After this 30 minute period of stirring at 80° C., stirring was discontinued and the slurry was allowed to cool to a new steady temperature of 60©C. to permit the β-cyclodextrin and silica to agglomerate. To aid this agglomeration, 5 cubic centimeters of water was added to the frying fat, β-cyclodextrin and silica composition. When it appeared by visual inspection that agglomeration of the β-cyclodextrin and silica was complete, the entire composition was filtered through a precoated filter paper using a slight vacuum to separate the agglomerated β-cyclodextrine and silica from the frying fat. The filter frying fat was recovered in a container and analyzed to determine its free fatty acid content. The analysis showed that the free fatty acid of the recovered frying fat had been reduced from 1.69% F.F.A. to 1.19% F.F.A.

EXAMPLE II

About 300 grams of frying fat that had been used for frying fish in a commercial restaurant and having a free fatty acid (F.F.A.) content of 2.25% was heated to a steady temperature of 80° C. To this 5% by weight (of the frying fat) of β-cyclodextrin and 3% by weight of Hyflo® super cel premixed in the form of a dry powder was added and stirred into the fat using a small laboratory blender operating at a speed of about 60 r.p.m. to form the composition into a slurry at 80° C. The slurry was held at this temperature while stirring continued. The ingredients of the slurry were allowed to react for 45 minutes. The mixed solids were then centrifuged from the fat and the fat was analyzed. The analysis showed that the free fatty acid of the recovered flying fat had been reduced from 2.25% F.F.A. to 1.72% F.F.A.

EXAMPLES III–VI

For Examples III–VI, the procedure of Example II using frying fat having a 2.25% F.F.A. content was again followed, however the frying fat was heated only to a temperature of 30° C. and the time allowed for reaction was 30 minutes, 60 minutes, 90 minutes and 120 minutes for Examples III, IV, V, and VI respectively. Analysis showed that the free fatty acid of the recovered frying fat had been reduced for each example as follows:

| | | |
|---|---|---|
| Example III | 30 minutes | 2.00% F.F.A. |
| Example IV | 60 minutes | 2.00% F.F.A. |
| Example V | 90 minutes | 1.69% F.F.A. |
| Example VI | 120 minutes | 1.69% F.F.A. |

EXAMPLES VII–X

For Examples VII–X, the procedure of Example III–VI using frying fat having a 2.25% F.F.A. content was again followed, however the flying fat was heated to a temperature of 65° C. Analysis showed that the free fatty acid of the recovered flying fat had been reduced for each example as follows:

| | | |
|---|---|---|
| Example VII | 30 minutes | 1.97% F.F.A. |
| Example VIII | 60 minutes | 1.97% F.F.A. |
| Example IX | 90 minutes | 1.72% F.F.A. |
| Example X | 120 minutes | 1.69% F.F.A. |

EXAMPLES XI–XIV

For Examples XI–XIV, the procedure of Example II using frying fat having a 2.25% F.F.A. content was again followed, however the frying fat was heated to a temperature of 85 ° C. and the time allowed for reaction was 20 migrates, 45 minutes, 75 minutes and 105 minutes for Examples XI, XII, XIII and XIV respectively. Analysis showed that the free fatty acid of the recovered frying fat had been reduced for each example as follows:

| | | |
|---|---|---|
| Example XI | 20 minutes | 2.18% F.F.A. |
| Example XII | 45 minutes | 1.69% F.F.A. |
| Example XIII | 75 minutes | 1.69% F.F.A. |
| Example XIV | 105 minutes | 1.71% F.F.A. |

EXAMPLES XV–XVIII

For Examples XV–XVIII, the procedure of Example II using frying fat having a 2.25% F.F.A. content was again followed, however, the β-cyclodextrin and the Hyflo® super cel were not premixed, but were separately stirred into the heated frying fat. Analysis showed that the free fatty acid of the recovered frying fat had been reduced for each example as follows:

| | | |
|---|---|---|
| Example XV | 20 minutes | 2.18% F.F.A. |
| Example XVI | 45 minutes | 1.96% F.F.A. |
| Example XVII | 75 minutes | 1.97% F.F.A. |
| Example XVIII | 105 minutes | 1.97% F.F.A. |

The greater effectiveness of premixing the β-cyclodextrin and the Hyflo® super cel is believed to likely be due to the larger surface area of these materials in contact with the heated frying fat during reaction.

EXAMPLES XIX–XX

About 300 grams of frying fat that had been used for frying fish in a commercial restaurant and having a free fatty acid (F.F.A.) content of 2.25% was heated to a steady temperature of 85 ° C. To this 6% by weight (of the frying fat) of β-cyclodextrin and 4% by weight of Hyflo® super cel premixed in the form of a dry powder was added and stirred into the fat using a small laboratory blender operating at a speed of about 60 r.p.m. to form the composition into a slurry at 80° C. The slurry was held at this temperature while stirring continued. In Example XIX the ingredients of the slurry were allowed to react for 20 minutes and in Example XX the ingredients of the slurry were allowed to react for 40 minutes. The mixed solids were then centrifuged from the fat and the fat was analyzed. The analysis showed that the free fatty acid of the recovered frying fat had been reduced from 2.25% F.F.A. to 1.69% F.F.A. in both examples.

EXAMPLE XXI

The procedure of Example XXI was followed, however the slurry mixture was cooled to room temperature and allowed to react at this temperature for 18 hours before the solids were centrifuged from the fat. Analysis showed that the free fatty acid of the recovered frying fat had been reduced to 1.55% F.F.A.

EXAMPLES XXII

The procedure of Example II was followed, however, 3% by weight of cellulose BNB 300 was used in place of the Hyflo® super cel and the reaction time was 40 minutes. Analysis showed that the free fatty acid of the recovered frying fat had been reduced to 1.72% F.F.A.

The foregoing examples have particularly illustrated the use of β-cyclodextrin in the process of this invention, but other cyclodextrins, mixtures containing homologous cyclodextrins, and derivatives of cyclodextrins may be used as well.

While the invention has been described in connection with specific embodiments thereof, it will be readily understood that the invention is capable of further modification without departing from the spirit of the invention and this application is intended to cover any variations, uses, or adaptations of the invention following, in general, the principles of the invention and including such departures from the present disclosure as come within known or customary practice in the art to which the invention pertains and as may be applied to the essential features set forth herein, and as fall within the scope of the invention and the limits of the following claims. Those skilled in the art will devise many other applications for the present invention, including many additional uses for the invention discloses. It is therefore intended that the scope of the present invention not be limited by the specification, but only by the following claims.

What is claimed is:

1. A method for reducing the free fatty acid content of frying fats and oils comprising:

heating the frying fats and oils to a temperature of less than about 120° C.;

mixing less than about 10% by weight of powdered cyclodextrin and less than about 10% by weight of a powdered absorbent material into the frying fats and oils to form a heated slurry;

maintaining the heated slurry at a relatively constant temperature below about 120° C. for a period of time ranging from more than about 5 minutes to less than about one and one half hours;

allowing the heated slurry to cool to a temperature sufficient to permit agglomeration of the cyclodextrin, absorbent material and free fatty acid; and filtering the agglomerated cyclodextrin, absorbent material and free fatty acid from the frying fats and oils.

2. The method of claim 1 wherein the cyclodextrin is β-cyclodextrin.

3. The method of claim 1 wherein not more than about 10% by weight of water is added to the slurry to aid agglomeration of the cyclodextrin, absorbent material and free fatty acid.

4. The method of claim 3 wherein not more than about 5% by weight of water is added.

5. The method of claim 4 wherein not more than about 2% by weight of water is added.

6. The method of claim 1 wherein the amount of cyclodextrin is about 5% by weight or less.

7. The method of claim 6 wherein the amount of absorbent material is about 5% by weight or less.

8. The method of claim 1 wherein the relatively constant temperature at which the slurry is maintained is within the range, of from about 60° C. to about 90° C.

9. The method of claim 1 wherein the absorbent material is selected from the group consisting of silica, diatomaceous earth and cellulose.

10. The method of claim 1 wherein the period of time during which the slurry is maintained at a relatively constant temperature is within the range of from about 15 minutes to about 45 minutes.

11. The method of claim 10 wherein the relatively constant temperature at which the slurry is maintained is within the range of from about 60° C. to about 90° C.

12. The method of claim 11 wherein the amount of cyclodextrin is about 5% by weight or less.

13. The method of claim 12 wherein the amount of absorbent material is about 5% by weight or less.

14. The method of claim 13 wherein the cyclodextrin is selected from the group consisting of α-cyclodextrin, β-cyclodextrin, γ-cyclodextrin or mixtures thereof.

15. The method of claim 14 wherein the cyclodextrin is β-cyclodextrin.

16. The method of claim 13 wherein not more than about 5% by weight of water is added to the slurry to aid agglomeration of the cyclodextrin, absorbent material and free fatty acid.

17. The method of claim 16 wherein not more than about 2% by weight of water is added.

18. The method of claim 17 where, in the cyclodextrin is selected from the group consisting of α-cyclodextrin, β-cyclodextrin, γ-cyclodextrin or mixtures thereof and the absorbent material is selected from the group consisting of silica, diatomaceous earth, and cellulose.

19. The method of claim 18 wherein the cyclodextrin is β-cyclodextrin and the absorbent material is silica.

20. A method for reducing the free fatty acid content of frying fats and oils comprising:

heating the frying fats and oils to a temperature of about 80° C.;

mixing about 5% by weight of powdered β-cyclodextrin and about 5% by weight of powdered silica into the frying fats and oils to form a heated slurry;

maintaining the heated slurry at a relatively constant temperature of about 80 ° C. for a period of time of about one half hour;

allowing the heated slurry to cool to a temperature of about 60° C. to permit agglomeration of the β-cyclodextrin, silica and free fatty acid; and filtering the agglomerated β-cyclodextrin, silica and free fatty acid from the frying fats and oils.

* * * * *